Sept. 18, 1928.
L. P. JACKSON
1,684,769
CONTAINER FOR TESTING DEVICES
Filed March 10, 1927
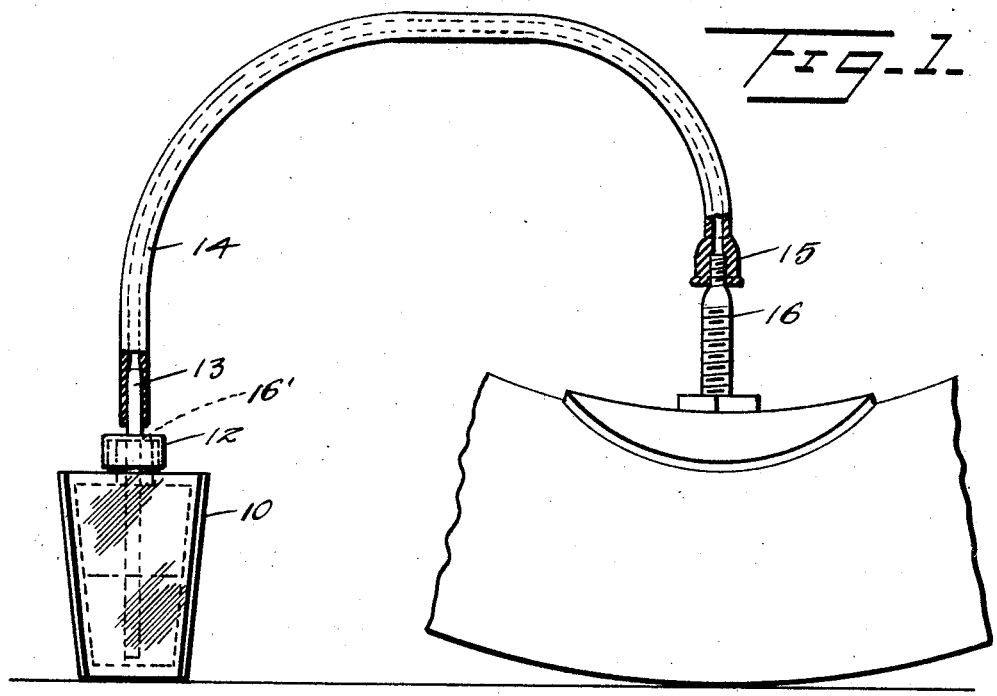
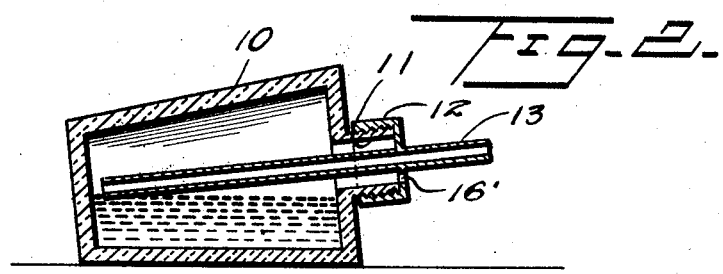
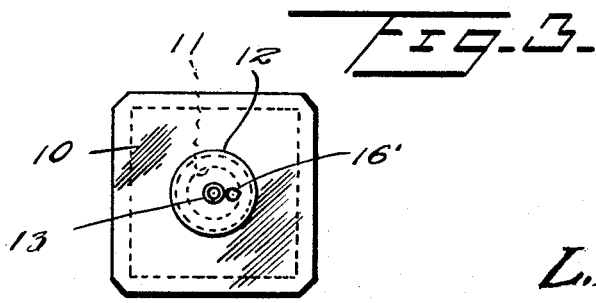
Inventor
L. P. Jackson.
By Watson E. Coleman
Attorney Patented Sept. 18, 1928.

1,684,769

UNITED STATES PATENT OFFICE.

LESTER P. JACKSON, OF EL PASO, TEXAS.

CONTAINER FOR TESTING DEVICES.

Application filed March 10, 1927. Serial No. 174,276.

This invention relates to testing devices and more particularly to a testing device for testing valves of the inner tubes of tires to determine whether the same are providing an effective seal.

An important object of the invention is to provide a device of this character which may be employed to make a test without regard to the position of the valve of the tire.

A further object of the invention is to produce a device of this character which may be very conveniently handled and readily and cheaply constructed.

These and other objects I attain by the construction shown in the accompanying drawings, wherein for the purpose of illustration is shown a preferred embodiment of my invention and wherein:—

Figure 1 is a side elevation partially in section showing a testing device constructed in accordance with my invention applied to a tire valve to test the same;

Figure 2 is a sectional view through the casing;

Figure 3 is an end elevation thereof.

Referring now more particularly to the drawings, the numeral 10 generally designates a trunco-pyramidal container of transparent material. The base end of the container has a hollow neck 11 communicating with the interior of the container and exteriorly screw-threaded for the reception of a threaded cap 12. This threaded cap 12 has rigidly secured thereto at the axis thereof a tube 13, the inner end of which is of such length as to extend into proximity to the bottom of the container when the cap is in position and the outer end of which is adapted for insertion in a length of flexible hose 14. The outer end of the flexible hose 14 is provided with a resilient nipple 15 adapted to fit over and form a seal with the end of a tire valve 16. The cap 12, immediately adjacent the tube 13, has a small opening 16 formed therein through which air may escape.

In the use of the device, the casing is approximately half filled with water and the cap tightly screwed thereon. The nipple 15 is placed over the tire valve 16 and the casing placed in an approximately upright position, at which time the lower end of the metallic tube 13 will be arranged beneath the level of the liquid, so that any air escaping from the tire valve must pass upwardly through the liquid in the form of bubbles. The shape of the casing employed enables this casing to be laid upon its side without danger of its rolling and at same time elevates the end having the outlet 16 to such a point that a considerable quantity of water can be left in the casing without danger of its passage from this outlet. The flexible tube enables the casing to be placed in substantially vertical position regardless of the position of the valve stem of the tire.

Since the construction hereinbefore set forth is capable of a certain range of change and modification without materially departing from the spirit of the invention, I do not limit myself to such specific structure except as hereinafter claimed.

I claim:—

A tire valve tester comprising a transparent container designed to receive a liquid, said container being of inverted frusto-pyramidal design and closed at each end, a relatively small nipple extending from the center of the larger end of the container and communicating with the interior thereof, a cap removably engageable over said nipple, and a tube carried by said cap and extending axially of the interior of the container to a point adjacent the smaller or lower end thereof, said cap having an air outlet aperture therethrough in close proximity to the tube, the container being so constructed that when it is approximately half filled with a liquid and laid upon one side, the liquid will not enter the tube or pass through said aperture.

In testimony whereof I hereunto affix my signature.

LESTER P. JACKSON.